(12) United States Patent
Peremarty et al.

(10) Patent No.: US 11,912,221 B2
(45) Date of Patent: Feb. 27, 2024

(54) ACTUATOR DEVICES AND ASSEMBLIES FOR AUTOMOTIVE SAFETY DEVICES

(71) Applicant: Autoliv ASP, Inc., Ogden, UT (US)

(72) Inventors: Francois Peremarty, Salt Lake City, UT (US); Jeff Kida, Layton, UT (US); Brent Alan Parks, Castle Rock, CO (US); Alan Ralph Larsen, Layton, UT (US); Lutz Staack, Dachau (DE); Sven Hoffmann, Dachau (DE)

(73) Assignee: Autoliv ASP, Inc., Ogden, UT (US)

(*) Notice: Subject to any disclaimer, the term of this patent is extended or adjusted under 35 U.S.C. 154(b) by 527 days.

(21) Appl. No.: 16/705,026

(22) Filed: Dec. 5, 2019

(65) Prior Publication Data

US 2021/0170970 A1 Jun. 10, 2021

(51) Int. Cl.
*B60R 21/017* (2006.01)
*B60R 21/16* (2006.01)
*B60R 21/01* (2006.01)

(52) U.S. Cl.
CPC ............ *B60R 21/017* (2013.01); *B60R 21/16* (2013.01); *B60R 2021/01211* (2013.01)

(58) Field of Classification Search
CPC . B60R 2021/01211; B60R 2021/23384; B60R 2021/23388; B60R 21/017; B60R 21/16; B60R 21/2338; B60R 2021/01061; B60R 2021/01068; B60R 2021/01075; B60R 13/0275; B60R 12/015; B60R 2021/21654; B60R 21/264; B60R 21/0176; B60R 22/1954; B60R 22/4628; B60G 2800/925; B64D 11/0621; G01G 19/4142; G01R 31/2829; A63C 9/0802
See application file for complete search history.

(56) References Cited

U.S. PATENT DOCUMENTS

| | | |
|---|---|---|
| 3,106,131 A | 10/1963 | Barr et al. |
| 3,930,449 A | 1/1976 | Buchele |
| 4,057,026 A | 11/1977 | Nabucet et al. |

(Continued)

FOREIGN PATENT DOCUMENTS

| | | | |
|---|---|---|---|
| CA | 2000755 C | * 4/1991 | |
| CA | 2000755 C | * 12/1998 | ......... B23K 26/0087 |

(Continued)

OTHER PUBLICATIONS

Peremarty, et al., Office Action dated May 25, 2021 for U.S. Appl. No. 16/705,044.

(Continued)

*Primary Examiner* — Metasebia T Retebo
*Assistant Examiner* — James G Yeaman
(74) *Attorney, Agent, or Firm* — Foley & Lardner LLP

(57) ABSTRACT

An actuator device with an actuator cup having a first end and a second end. The actuator cup defines a storage chamber containing a pyrotechnic material to produce gas. The storage chamber also includes a coolant. At least one electrical connection coupled to the first end, the electrical connection in reaction initiating communication with the pyrotechnic material. The second end of the actuator cup includes a concave surface before actuation of the pyrotechnic material and during the actuation of the pyrotechnic material the second end transitions from the concave surface to a convex surface.

18 Claims, 7 Drawing Sheets

(56) References Cited

U.S. PATENT DOCUMENTS

| | | | |
|---|---|---|---|
| 4,453,292 A | 6/1984 | Bakker | |
| 5,269,098 A | 12/1993 | Redman | |
| 5,402,728 A | 4/1995 | Garner | |
| 5,458,364 A | 10/1995 | Mueller et al. | |
| 5,718,531 A | 2/1998 | Mutschler, Jr. et al. | |
| 5,771,742 A | 6/1998 | Bokaie et al. | |
| 5,887,894 A | 3/1999 | Castagner et al. | |
| 6,076,854 A | 6/2000 | Schenck et al. | |
| 6,164,689 A | 12/2000 | Rivin et al. | |
| 6,238,438 B1 | 5/2001 | Fischer et al. | |
| 6,299,203 B1 | 10/2001 | Muller | |
| 6,390,501 B1 | 5/2002 | Greib et al. | |
| 6,454,300 B1 | 9/2002 | Dunkle et al. | |
| 6,511,094 B2 | 1/2003 | Thomas et al. | |
| 6,513,835 B2 | 2/2003 | Thomas | |
| 6,561,545 B2 | 5/2003 | Greib et al. | |
| 6,565,114 B1 | 5/2003 | Thomas | |
| 6,581,964 B2 | 6/2003 | Braunschadel | |
| 6,616,184 B2 | 9/2003 | Fischer | |
| 6,634,671 B2 | 10/2003 | Heigl et al. | |
| 6,736,426 B2 | 5/2004 | Winters et al. | |
| 6,832,778 B2 | 12/2004 | Pinsenschaum et al. | |
| 6,843,157 B2 | 1/2005 | Hamilton et al. | |
| 6,886,338 B2 | 5/2005 | Fischer et al. | |
| 6,918,614 B2 | 7/2005 | Ryan | |
| 6,932,384 B2 | 8/2005 | Waid et al. | |
| 6,932,385 B2 | 8/2005 | Hawthorn et al. | |
| 6,972,659 B2 | 12/2005 | von Behrens et al. | |
| 6,981,374 B2 | 1/2006 | von Behrens et al. | |
| 7,017,345 B2 | 3/2006 | Von Behrens et al. | |
| 7,017,945 B2 | 3/2006 | Depottey et al. | |
| 7,021,657 B2 | 4/2006 | Kassman et al. | |
| 7,063,019 B2 | 6/2006 | Parks et al. | |
| 7,063,377 B2 | 6/2006 | Brei et al. | |
| 7,086,297 B2 | 8/2006 | Blakesley et al. | |
| 7,111,871 B2 | 9/2006 | Thomas | |
| 7,144,037 B2 | 12/2006 | Qvint et al. | |
| 7,188,567 B1 * | 3/2007 | Italiane | B60R 21/264 |
| | | | 280/736 |
| 7,195,281 B2 | 3/2007 | Williams et al. | |
| 7,240,917 B2 | 7/2007 | Fogle, Jr. et al. | |
| 7,249,783 B2 | 7/2007 | Parkinson et al. | |
| 7,261,320 B2 | 8/2007 | Fredin et al. | |
| 7,275,763 B2 | 10/2007 | Thomas et al. | |
| 7,374,205 B2 * | 5/2008 | Thomas | B60R 21/2171 |
| | | | 280/743.2 |
| 7,419,184 B2 | 9/2008 | Green et al. | |
| 7,448,646 B2 | 11/2008 | Hall | |
| 7,461,859 B2 * | 12/2008 | Fogle, Jr. | B60R 21/276 |
| | | | 280/739 |
| 7,510,212 B2 | 3/2009 | Green et al. | |
| 7,607,689 B2 | 10/2009 | Kalczynski et al. | |
| 7,690,683 B2 | 4/2010 | Parks et al. | |
| 7,695,014 B2 | 4/2010 | Parks et al. | |
| 7,731,223 B2 | 6/2010 | Lee et al. | |
| 7,784,827 B2 | 8/2010 | Smith et al. | |
| 7,841,623 B2 | 11/2010 | Ito | |
| 7,938,444 B2 | 5/2011 | Williams et al. | |
| 7,980,591 B2 | 7/2011 | Schonhuber et al. | |
| 8,235,417 B2 | 8/2012 | Warren et al. | |
| 8,353,525 B2 | 1/2013 | Parks et al. | |
| 8,408,584 B2 | 4/2013 | Paxton et al. | |
| 8,408,585 B2 | 4/2013 | Paxton et al. | |
| 8,602,453 B1 | 12/2013 | Stevens et al. | |
| 8,628,114 B1 | 1/2014 | Quioc | |
| 2002/0117840 A1 | 8/2002 | Dunkle et al. | |
| 2001/0125705 | 9/2002 | Wong et al. | |
| 2003/0034637 A1 | 2/2003 | Wang et al. | |
| 2003/0172750 A1 | 9/2003 | Blakesley et al. | |
| 2004/0012179 A1 | 1/2004 | Pinsenschaum et al. | |
| 2004/0012180 A1 | 1/2004 | Hawthorn et al. | |
| 2004/0046374 A1 | 3/2004 | Yamazaki | |
| 2004/0046376 A1 | 3/2004 | Ryan | |
| 2004/0051285 A1 | 3/2004 | Fischer | |
| 2004/0112239 A1 | 6/2004 | Parks et al. | |
| 2004/0164526 A1 | 8/2004 | Hasebe et al. | |
| 2004/0232676 A1 | 11/2004 | Qvint et al. | |
| 2004/0232677 A1 | 11/2004 | Fischer et al. | |
| 2005/0023811 A1 | 2/2005 | Thomas et al. | |
| 2005/0040634 A1 | 2/2005 | Braun et al. | |
| 2005/0057027 A1 | 3/2005 | Fogle, Jr. et al. | |
| 2005/0057030 A1 | 3/2005 | Fischer et al. | |
| 2005/0104347 A1 | 5/2005 | Hawthorn et al. | |
| 2005/0127648 A1 | 6/2005 | Fischer et al. | |
| 2005/0146122 A1 | 7/2005 | Gould et al. | |
| 2005/0161922 A1 | 7/2005 | Bilbrey et al. | |
| 2005/0212273 A1 | 9/2005 | Thomas et al. | |
| 2005/0225065 A1 | 10/2005 | Fujll | |
| 2005/0248137 A1 | 11/2005 | Delventhal et al. | |
| 2006/0012191 A1 | 1/2006 | Brei et al. | |
| 2006/0027120 A1 * | 2/2006 | Smith | F42B 3/125 |
| | | | 102/202.12 |
| 2006/0071461 A1 | 4/2006 | Williams et al. | |
| 2006/0071462 A1 | 4/2006 | Smith et al. | |
| 2006/0151975 A1 | 7/2006 | Yamaji et al. | |
| 2006/0170202 A1 | 8/2006 | Block et al. | |
| 2006/0186655 A1 | 8/2006 | Ehrke | |
| 2006/0192370 A1 | 8/2006 | Abe et al. | |
| 2006/0214398 A1 | 9/2006 | Fredin et al. | |
| 2006/0214406 A1 | 9/2006 | Parkinson et al. | |
| 2006/0284404 A1 | 12/2006 | Green et al. | |
| 2006/0290117 A1 | 12/2006 | Fischer et al. | |
| 2007/0029762 A1 | 2/2007 | Katsuda et al. | |
| 2007/0040366 A1 | 2/2007 | Maidel et al. | |
| 2007/0108750 A1 | 5/2007 | Bauer et al. | |
| 2007/0170709 A1 | 7/2007 | Braun et al. | |
| 2007/0194561 A1 | 8/2007 | Thomas | |
| 2007/0205590 A1 | 9/2007 | Klinkenberger et al. | |
| 2007/0205591 A1 | 9/2007 | Bito | |
| 2007/0216146 A1 | 9/2007 | Williams | |
| 2007/0252370 A1 | 11/2007 | Thomas | |
| 2008/0023950 A1 | 1/2008 | Kalczynski et al. | |
| 2008/0036188 A1 | 2/2008 | Gould et al. | |
| 2008/0203716 A1 | 8/2008 | Parks et al. | |
| 2008/0238050 A1 | 10/2008 | Green et al. | |
| 2008/0238062 A1 | 10/2008 | Parks et al. | |
| 2009/0039630 A1 | 2/2009 | Schneider et al. | |
| 2009/0230663 A1 | 9/2009 | Mills et al. | |
| 2009/0267326 A1 | 10/2009 | Ito | |
| 2009/0302588 A1 | 12/2009 | Schramm | |
| 2009/0309342 A1 | 12/2009 | Schonhuber | |
| 2010/0078924 A1 | 4/2010 | Mitsuo et al. | |
| 2010/0090445 A1 | 4/2010 | Williams et al. | |
| 2010/0090450 A1 | 4/2010 | Webber | |
| 2011/0030941 A1 | 2/2011 | Parks et al. | |
| 2012/0242068 A1 | 9/2012 | Paxton et al. | |
| 2012/0242069 A1 | 9/2012 | Parks et al. | |
| 2012/0242070 A1 | 9/2012 | Paxton et al. | |
| 2012/0306187 A1 * | 12/2012 | Mendez | B60R 21/239 |
| | | | 280/743.2 |
| 2014/0016990 A1 | 1/2014 | Weber | |
| 2014/0101923 A1 * | 4/2014 | Clark | F16B 41/002 |
| | | | 29/525.11 |
| 2019/0198277 A1 | 6/2019 | McTigue et al. | |
| 2020/0070765 A1 | 3/2020 | Hiraiwa et al. | |
| 2021/0014969 A1 | 5/2021 | Bush et al. | |
| 2021/0170982 A1 | 6/2021 | Peremarty et al. | |

FOREIGN PATENT DOCUMENTS

| | | | | |
|---|---|---|---|---|
| DE | 10161515 A1 * | 9/2002 | | B60R 21/264 |
| DE | 102009005771 | 7/2010 | | |
| DE | 102011115518 A1 * | 4/2013 | | B60R 21/264 |
| DE | 102011115518 A1 * | 4/2013 | | B60R 21/264 |
| EP | 0811533 A2 | 12/1997 | | |
| EP | 0811533 A2 * | 12/1997 | | |
| EP | 1769978 | 4/2007 | | |
| EP | 1866190 | 12/2010 | | |
| EP | 1866233 | 4/2012 | | |
| JP | H09175312 A * | 7/1997 | | |
| JP | 2002507518 | 3/2002 | | |
| JP | 2002362301 | 12/2002 | | |
| JP | 2004521801 | 7/2004 | | |
| JP | 2004262427 | 9/2004 | | |

(56) References Cited

FOREIGN PATENT DOCUMENTS

| | | |
|---|---|---|
| JP | 2005053329 | 3/2005 |
| JP | 2008534354 | 8/2008 |
| JP | 2008543656 | 12/2008 |
| WO | 199631370 | 10/1996 |
| WO | 199948728 | 3/1999 |
| WO | 2002068249 | 9/2002 |
| WO | 2003006276 | 1/2003 |
| WO | 2004007975 | 1/2004 |
| WO | 2005087549 | 9/2005 |
| WO | 2006101588 | 9/2006 |
| WO | 2006102432 | 9/2006 |
| WO | 2006137989 | 12/2006 |
| WO | 2008118526 | 10/2008 |
| WO | 2010045040 | 4/2010 |
| WO | 2012129467 | 9/2012 |
| WO | 2021113078 | 6/2021 |

OTHER PUBLICATIONS

International Search Report and Written Opinion dated Feb. 10, 2021 for international application PCT/US2020/061075.
International Search Report and Written Opinion dated Feb. 5, 2021 for international application PCT/US2020/061079.

* cited by examiner

ACTUATOR DEVICES AND ASSEMBLIES FOR AUTOMOTIVE SAFETY DEVICES

TECHNICAL FIELD

The present disclosure relates generally to the field of automotive protective systems. More specifically, the present disclosure relates to automotive safety systems that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1:
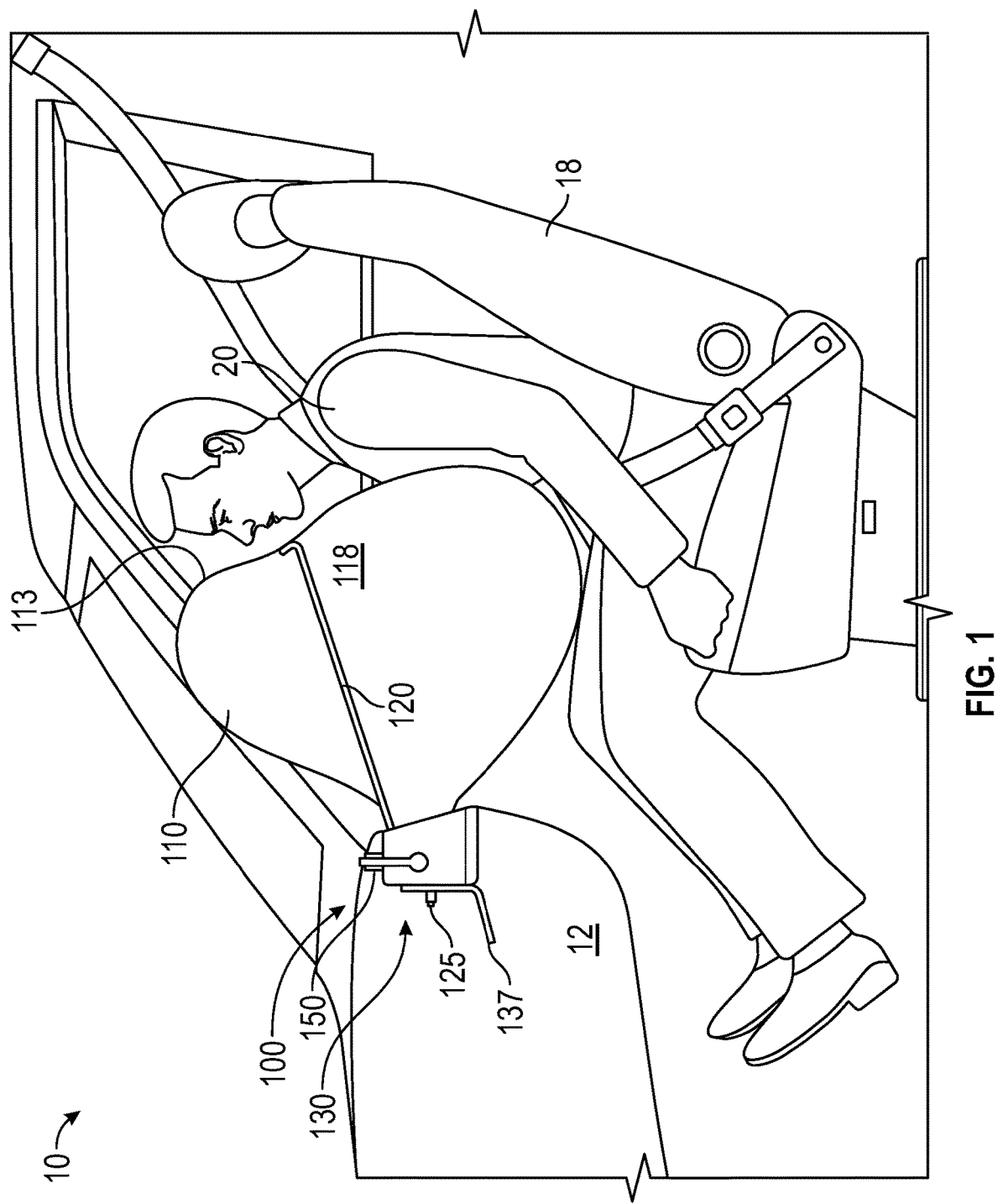
FIG. 1 is a perspective view of an interior of a vehicle with a passenger, wherein an airbag assembly has been deployed to a first configuration.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

During a vehicle collision event, one or more sensors provide data to an engine control unit (ECU) and/or airbag control unit (ACU), which determines if threshold conditions have been met for deployment of an automotive safety device such as an airbag (or a plurality of airbags). The ECU/ACU may cause an electrical pulse to be sent to an initiator of an automotive safety device.

Conventional initiators may comprise a pyrotechnic relay load that is ignited and heats or burns. The activation of an initiator may produce an effect or otherwise set in motion events to initiate operation of an automotive safety device. In the case of an airbag assembly, the initiator may ignite a chemical compound within an inflator of the airbag assembly. The chemical compound burns rapidly and produces a volume of inert gas that is directed to fill the airbag itself. In other airbag assembly embodiments, the initiator may produce a volume of gas that increases pressure within a compressed air chamber, thereby bursting the chamber and releasing a larger volume of inflation gas to fill the air bag. In still other embodiments, an initiator may initiate or otherwise produce another effect, such as cutting or releasing a tether, displacing a component, pre-tensioning a seat belt, and the like.

Attempts have been made to use conventional initiators to actuate mechanisms of automotive safety devices, or to otherwise deploy or actuate automotive safety devices. However, an initiator typically produces a gas and/or a flame which can prove detrimental in certain actuation scenarios. The present disclosure describes embodiments of actuator assemblies that include similar principles of operations as initiators, but are flameless, and a housing of the actuator maintains its integrity. In other words, the actuator maintains its integrity by not bursting open during actuation. The disclosed actuator assemblies are described in the operation with an airbag assembly. As can be appreciated, the disclosed actuator assemblies may be used with various types of airbag assemblies, including, for example, front air bags, inflatable curtains, passenger air bags, side airbags, etc. The disclosed embodiments of actuator assemblies may also be utilized in conjunction with any of a variety of automotive safety devices in addition to inflatable airbag modules, including, but not limited to, a knee bolster, a seat belt pretensioner, a tether cutter, or any other automotive safety device.

The phrases "connected to," "coupled to," and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Figure 2:
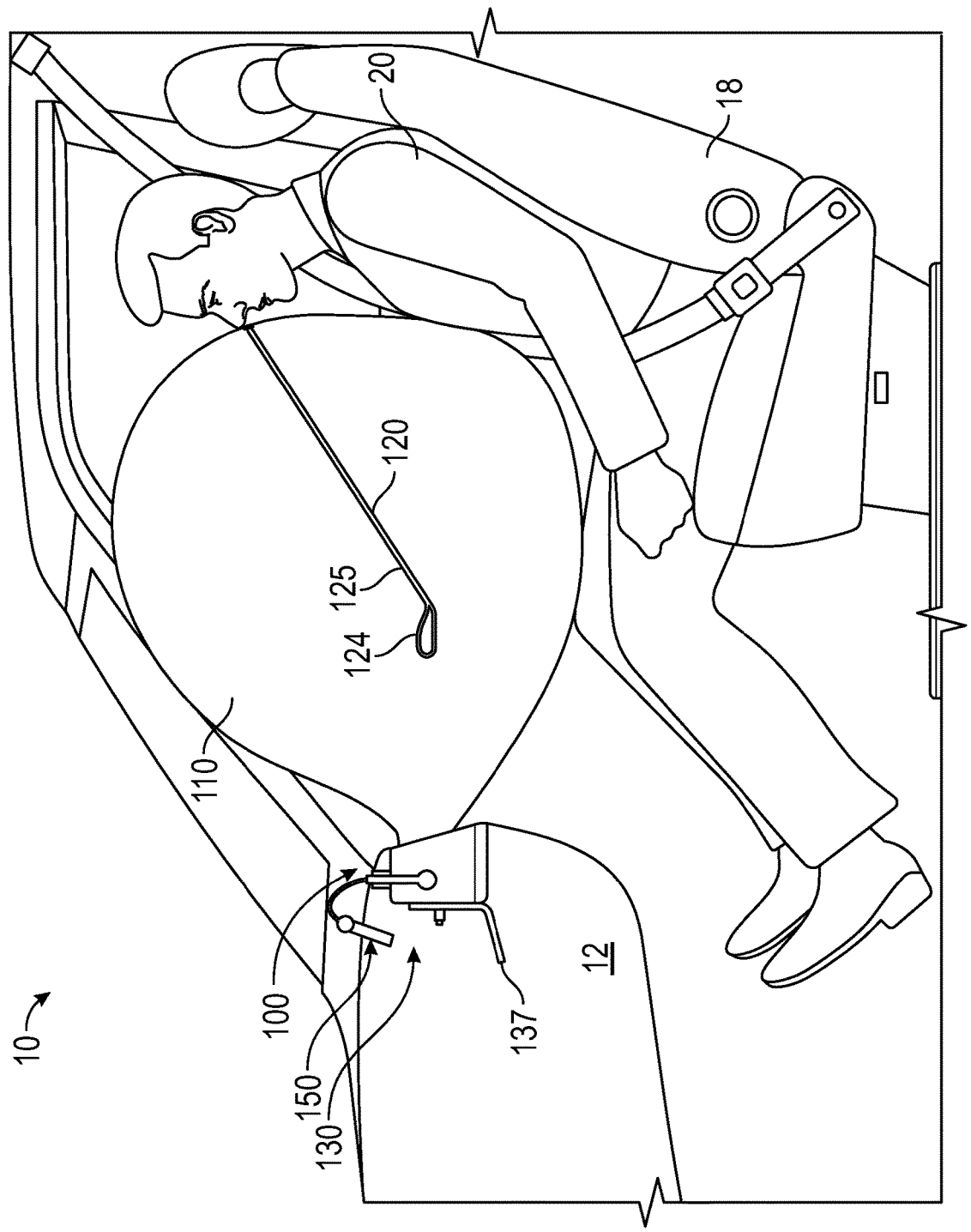
FIG. 2 is a perspective view of an interior of a vehicle with a passenger, wherein the airbag assembly of FIG. 1 has been deployed to a second configuration.

FIGS. 1-2 depict perspective views of an interior of a vehicle 10, in which an occupant 20 is seated on a seat 18. An inflatable airbag assembly 100 is depicted in a deployed configuration. The airbag assembly 100 may comprise an inflatable airbag 110, one or more tethers 120, a housing 130, and a tether release assembly 150. The airbag assembly 100 is depicted as being mounted in an instrument panel 12, via a mounting bracket 137.

The airbag assembly 100 may be used to minimize occupant injury in a collision scenario. The airbag assembly 100 may be installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

In FIG. 1, the airbag assembly 100 provides a front airbag 110. Front airbags are typically installed in the steering wheel and/or an instrument panel of a vehicle. During installation, the airbag 110 may be rolled, folded, or both, and retained in the rolled/folded state behind a cover. During a collision event, vehicle sensors trigger the activation of an inflator, which rapidly fills the airbag with inflation gas. Thus, the airbag rapidly changes configurations from the rolled/folded configuration to an expanded configuration. A deployed configuration of the airbag 110 may be partially determined by one or more internal or external tethers, such as tether 120. The tether 120 may limit or restrict the width, depth, and/or height of the airbag 110. Further the tether 120 may be configured to be releasable such that the airbag 110 may adopt more than one deployed configuration. As will be described, an actuator according to the present disclosure may be utilized to initiate a release of the tether 120. In other embodiments, an actuator according to the present disclosure may be utilized to initiate a severing (e.g., cutting) of the tether 120.

In FIG. 1, the airbag assembly 100 is in an inflated state and extends from the housing 130 to a predetermined depth in a car-rearward direction. The tether 120 may be located within an inflatable void 118 of the inflatable airbag 110 such that a front face 113 of the inflatable airbag 110 may be deployed to a predetermined depth. The tether 120 comprises a connecting portion 125, which connects the tether 120 to the tether release assembly 150.

The tether release assembly 150 may either retain the connecting portion 125 or release the connecting portion 125 such that the inflatable airbag 110 may adopt either a constrained configuration or an unconstrained, fully deployed configuration, as depicted in FIG. 2. Before or during deployment of the inflatable airbag 110, one or more vehicle sensors may electronically signal the tether release assembly 150 to release the tether 120 and thereby allow the inflatable airbag 110 to deploy without constraint imposed by the tether 120. In the depicted embodiment, the connecting portion 125 of the tether 120 comprises a loop 124 that may be retained or released by the tether release assembly 150.

As will be appreciated by those skilled in the art, one or more vehicle sensors of a variety of types and configurations can be utilized to configure a set of predetermined conditions that will dictate whether the tether release assembly 150 releases the tether 120. For example, in one embodiment, a seat rail sensor is utilized to detect how close or far away from an airbag deployment surface an occupant's seat is positioned. In another embodiment, a seat scale may be used to determine whether an occupant is occupying the seat and, if so, ascertain an approximate weight of the occupant. In yet another embodiment an optical or infrared sensor may be used to determine an occupant's approximate surface area and/or distance from an airbag deployment surface. In another embodiment, an accelerometer is employed to measure the magnitude of negative acceleration experienced by a vehicle, which may indicate whether an accident has occurred and the severity of the accident. Additionally, a combination of these and other suitable sensor types may be used.

The present disclosure is directed to the tether release assembly 150 (and specifically an actuator of the tether release assembly 150) and methods of detaching the tether 120 from the tether release assembly 150. When the tether release assembly 150 is actuated, the tether 120 is released or detached from the tether release assembly 150. The tether release assembly 150 may comprise a plurality of components, such as an assembly housing (e.g., assembly housing 300 in FIG. 7), an actuator assembly (e.g., actuator assembly 200 in FIG. 3A), and a tether 120. Compared to other safety device actuators, the disclosed actuator assembly 200 may be smaller due to the fact that the portion of the actuator doing the work is actually the actuator cup itself and a separate piston or pushing component is not needed in the actuator assembly 200, thereby reducing the overall envelope. In other words, the overall size of the device may be smaller than other similar devices because device contains fewer parts.

Figure 3A:
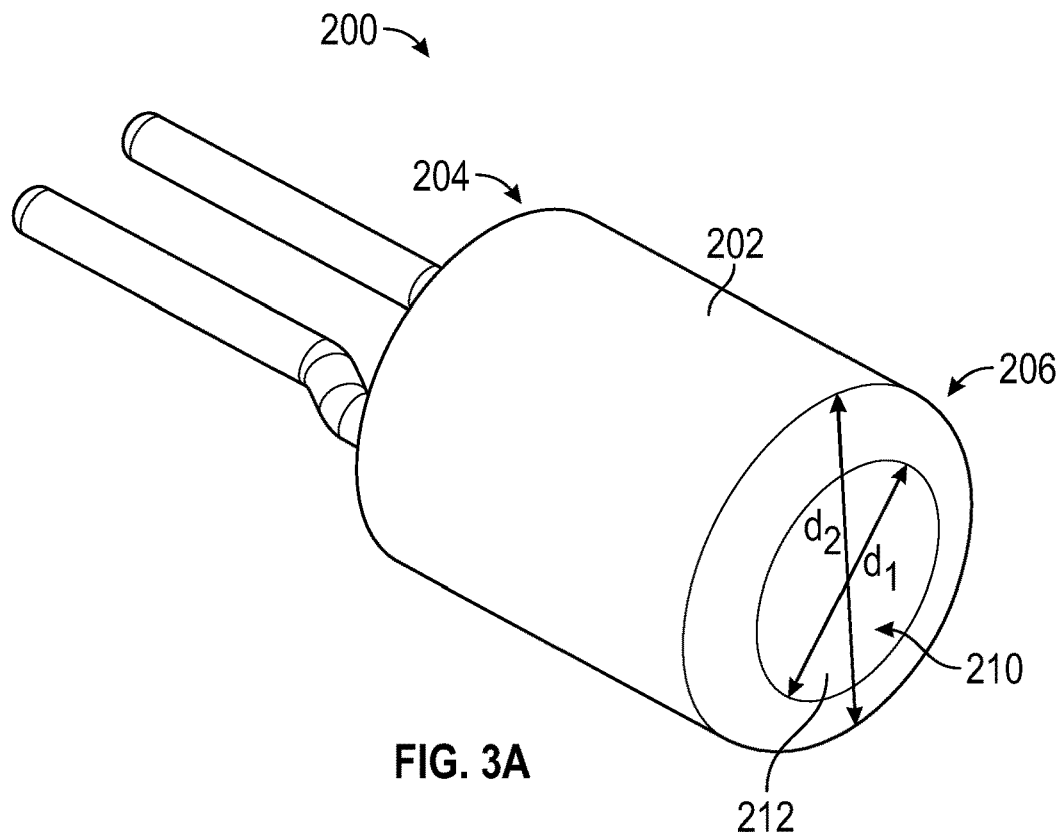
FIG. 3A is an isometric view of an actuator assembly according to one embodiment.
Figure 3B:
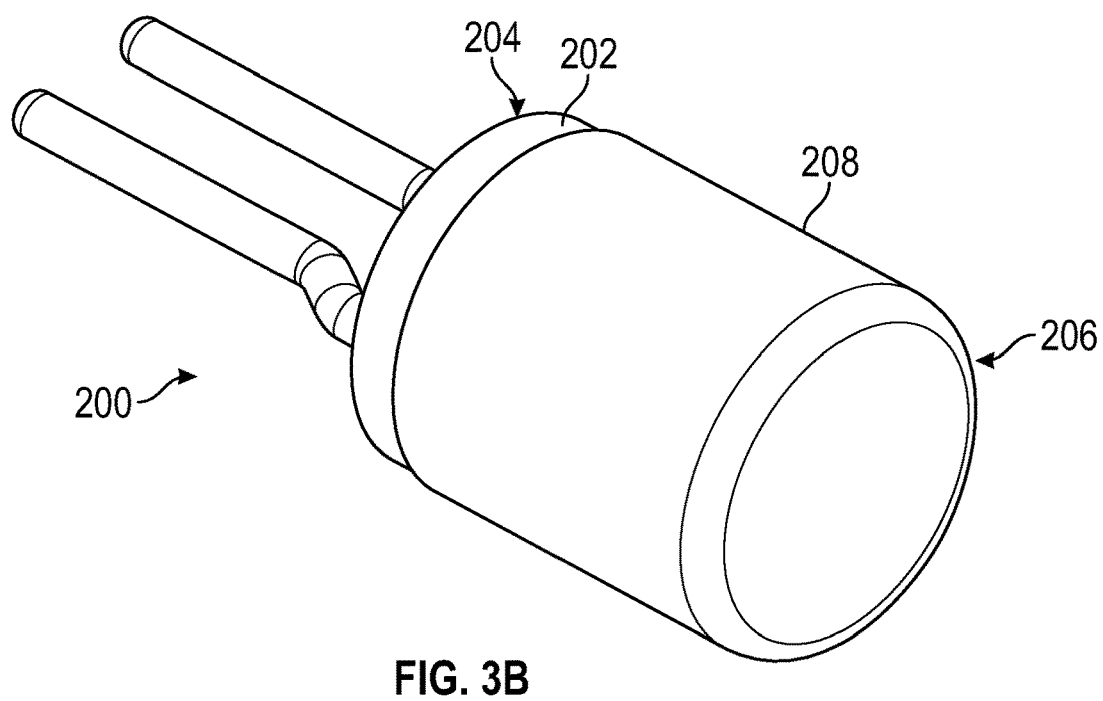
FIG. 3B is an isometric view of an actuator assembly with an electrical insulation layer according to one embodiment.

FIGS. 3A and 3B illustrate an isometric view of the actuator assembly 200 according to one embodiment. The actuator assembly 200 comprises a hollow tubular housing 202 (e.g., an actuator cup). The tubular housing 202 includes opposing first and second longitudinal ends 204, 206. The first longitudinal end 204 may also be referred to as a proximal end of the actuator assembly 200 and the second longitudinal end 206 may be referred to as a distal end of the actuator assembly 200. In some embodiments, an electrical insulation layer 208 encompasses a portion (e.g., a majority) of the tubular housing 202 and the second longitudinal end 206, as illustrated in FIG. 3B. The electrical insulation layer 208 may be a high dielectric plastic layer to help prevent inadvertent deployment of the actuator assembly 200, such as by an inadvertent electrical charge as may occur through building of static electricity. In some embodiments, the tubular housing 202 does not include the electrical insulation layer 208, as illustrated in FIG. 3A.

As illustrated in FIG. 3A, the second longitudinal end 206 of the tubular housing 202 may comprise a surface 210 with a predetermined shape. For example, in one embodiment, the second end 206 of the tubular housing 202 in a pre-actuation configuration comprises a concave surface 212 and the second end 206 of the tubular housing 202 in a post-actuation configuration comprises a convex surface (e.g. see convex surface 214 in FIG. 4B). As discussed in more detail below, during actuation of the actuator assembly 200, the second end 206 of the tubular housing 202 may transition from the concave surface 212 to the convex surface 214.

Figure 4A:
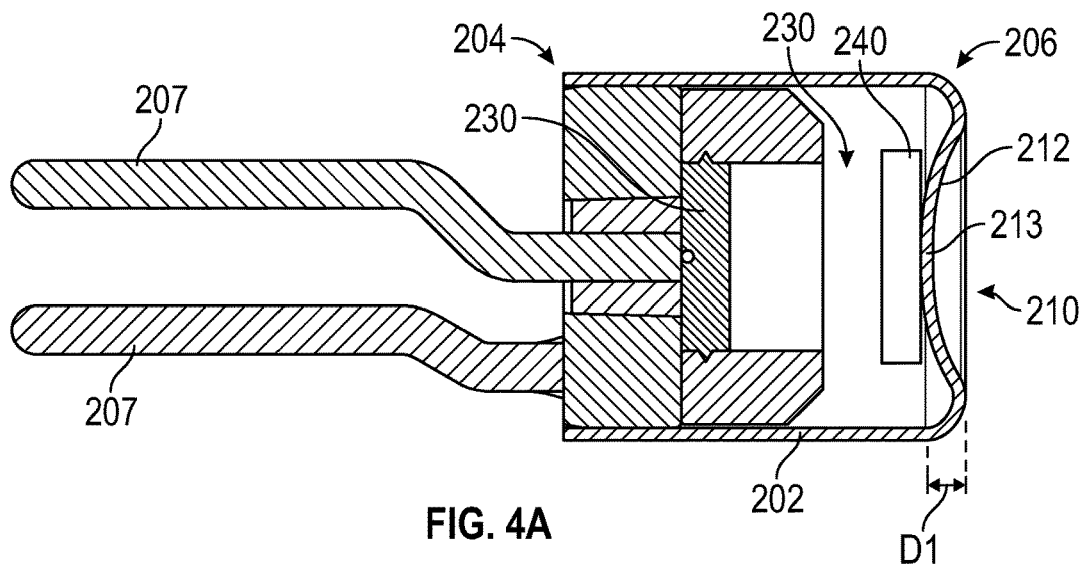
FIG. 4A is a cross-sectional view of the actuator assembly of FIG. 3A in a pre-actuation configuration.
Figure 4B:
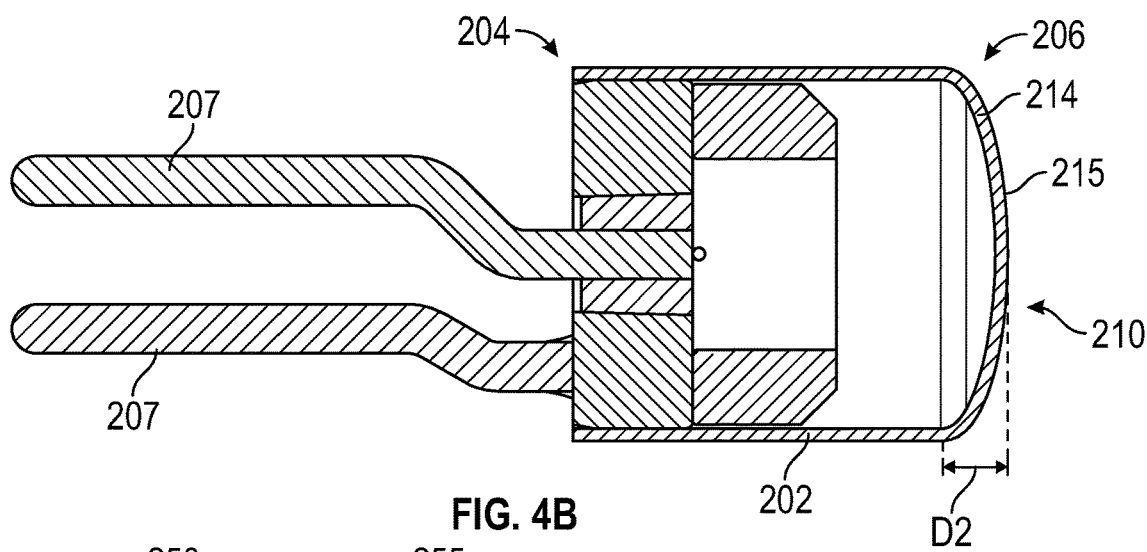
FIG. 4B is a cross-sectional view of the actuator assembly of FIG. 4A in a post-actuation configuration.

FIGS. 4A and 4B illustrate a cross-sectional view of the actuator assembly 200, according to one embodiment. FIG. 4A illustrates the actuator assembly 200 in a pre-actuation configuration and FIG. 4B illustrates the actuator assembly 200 in a post-actuation configuration. During (e.g., throughout the course of) actuation, the actuator assembly 200 maintains its integrity. In other words, the actuator assembly 200 maintains its integrity by not bursting open during actuation. Thus, the actuator assembly 200 is flameless (e.g., does not produce a flame during actuation). The actuator assembly 200 defines a storage chamber 220 for housing a pyrotechnic material 230. For example, in one embodiment, the pyrotechnic material 230 may be Zirconium Potassium Percholate (ZPP), Zirconium Tungsten Potassium Perchlorate (ZWPP), or any other suitable composition.

The actuator assembly 200 may further comprise electrical conductors 207 (e.g., pins) that are configured to actuate the actuator assembly 200 and ignite the pyrotechnic material 230 when an electrical signal is received, resulting in a collision event. In other words, the electrical conductors 207 create an electrical connection that initiates communication with the pyrotechnic material 230. In other words, the electrical conductors 207 are in reaction initiating communication with the pyrotechnic material 230. The electrical signal may pass through a bridgewire across a distal end of the electrical conductors 207 so as to ignite the pyrotechnic material 230. The ignition of the pyrotechnic material 230 produces gas and a sufficient pressure wave to transition the second end 206 of the tubular housing 202 from the concave surface 212 to the convex surface 214. The deformation of the second end 206 of the tubular housing 202 occurs in the longitudinal or axial direction. In other words, pre-actuation (FIG. 4A) the second end 206 of the tubular housing 202 comprises the concave surface 212 and post-actuation (FIG. 4B) the second end 206 of the tubular housing 202 comprises the convex surface 214. The actuation of the actuator assembly 200 is contained within the actuator assembly 200, and no external ballistic event occurs before, during, or after actuation of the actuator assembly 200. Further, there are no loose or unattached parts that can fly around within the vehicle after the actuation of the actuator assembly 200 as all loose parts are contained within the actuator assembly 200.

In the pre-actuation configuration, the surface 210 of the second end 206 of the tubular housing 202 comprises the concave surface 212. The concave surface 212 comprises an inflection point 213 that is disposed a predetermined distance D1 from the second end 206 of the tubular housing 202. In some embodiments, the distance D1 is at least 0.3 mm. In some embodiments, the distance D1 is at least 0.5 mm. In some embodiments, the distance D1 is not greater than 3 mm.

In the post-actuation configuration, the surface 210 of the second end 206 of the tubular housing 202 comprises the convex surface 214. The convex surface 214 comprises an inflection point 215 that is disposed a predetermined distance D2 from the second end 206 of the tubular housing 202. In some embodiments, the distance D2 is at least 0.3 mm. In some embodiments, the distance D2 is at least 0.5 mm. In some embodiments, the distance D2 is not greater than 3 mm.

In some embodiments, the inflection point 213 of the pre-actuation concave surface 212 transitions longitudinally (i.e., axially) between 1 mm and 6 mm to the inflection point 215 of the post-actuation convex surface 214. In some embodiments, the inflection point 213 of the pre-actuation concave surface 212 transitions longitudinally (i.e., axially) between 1 mm and 3 mm to the inflection point 215 of the post-actuation convex surface 214.

Actuation of the actuator assembly 200 may occur quickly. For example, the transition from the concave surface 212 to the convex surface 214 may occur at speeds faster than 0.4 msec. In some embodiments, the speed of transition from the concave surface 212 to the convex surface 214 may be less than 0.3 msec. In some embodiments, the speed of transition from the concave surface 212 to the convex surface 214 may be less than 0.2 msec. In some embodiments, the speed of transition from the concave surface 212 to the convex surface 214 may be less than 0.1 msec. Because actuation of the actuator assembly 200 is contained (e.g., gas, ballistic events) within the actuator assembly 200, the actuation time is significantly reduced compared to existing systems that work with the physical effects of the actuator's ballistic gases outside the actuator, which requires more time, such as 1.6 msec.

In some embodiments, in the pre-actuation configuration, the concave surface 212 may have a circular shape. A diameter d1 of the concave surface 212 may be the same as a diameter d2 of the tubular housing 202. In some embodiments, the diameter d1 of the concave surface 212 may be less than the diameter d2 of the tubular housing 202.

In some embodiments, in the post-actuation configuration, the convex surface 214 may have a circular shape. A diameter of the convex surface 214 may be the same as the diameter of the tubular housing 202. In some embodiments, the diameter of the convex surface 214 may be less than the diameter of the tubular housing 202.

The actuator assembly 200 may further comprise a coolant 240 disposed within the chamber 220. The coolant 240 may mitigate the deflagration temperature of the pyrotechnic material 230 and may prevent the burn-through ballistic rupture of the second end 206 of the tubular housing 202. The prevention of the burn-through ballistic rupture of the second end 206 makes the actuator assembly 200 flameless. One benefit of the coolant 240 in the actuator assembly 200 is there is no hazard of cup rupture during normal function or even in a bonfire.

The coolant 240 may be disposed within the chamber 220 of the tubular housing 202 between the pyrotechnic material 230 and the second end 206 of the tubular housing 202. The coolant 240 may be spaced apart from the pyrotechnic material 230. In some embodiments, the coolant 240 may be disposed along the entire inner surface of the second end 206 of the tubular housing 202. In some embodiments, the coolant 240 may be disposed at the inflection point 213 of the second end 206. The coolant 240 may be a slurry so that the coolant stays in the desired location after being placed in the tubular housing 202.

In certain aspects, the coolant 240 has a decomposition temperature in the range of greater than or equal to about 180° C. to less than or equal to about 450° C., meaning that the compound decomposes endothermically within this temperature range for example by releasing water or carbon dioxide. The coolant 240 nay be selected per its cooling efficiency. In certain preferred variations, the coolant 240 comprises aluminum hydroxide ($Al(OH)_3$). However, in alternative variations the following compounds could be employed as a coolant component: Aluminum Hydroxide, Hydromagnesite, Dawsonite, Zinc borate hydrate, Magnesium Hydroxide, Magnesium Carbonate Subhydrate, Bohemite, Calcium Hydroxide, Dolomite, Huntite, Montmorillonite, and combinations thereof. Each of these compounds decomposes endothermically within the desired temperature range of greater than or equal to 180° C. to less than or equal to 450° C., as set forth in Table 1 below.

TABLE 1

| Compound | Chemical Formula | Decomposition Temp. ° C. |
|---|---|---|
| Aluminum Hydroxide | $Al(OH)_3$ | 180-200 |
| Hydromagnesite | $Mg_5(CO_3)_4(OH)_2 \cdot 4H_2O$ | 220-240 |
| Dawsonite | $NaAl(OH)_2CO_3$ | 240-260 |
| Zinc borate hydrate | $2ZnO \cdot 3B_2O_3 \cdot 3.5H_2O$ | 290 |
| Magnesium Hydroxide | $Mg(OH)_2$ | 300-320 |
| Magnesium Carbonate Subhydrate | $MgO \cdot CO_2 \cdot H_2O_{(0.3)}$ | 340-350 |
| Bohemite | $AlO(OH)$ | 340-350 |
| Calcium Hydroxide | $Ca(OH)_2$ | 430-450 |

TABLE 1-continued

| Compound | Chemical Formula | Decomposition Temp. ° C. |
|---|---|---|
| Dolomite | $CaMg(CO_3)_2$ | ~650 |
| Huntite | $Mg_3Ca(CO_3)_4$ | ~180 |
| Montmorillonite | $(Na,Ca)_{0.33}(Al,Mg)_2(Si_4O_{10})(OH)_2 \cdot nH_2O$ | 300 |

The amount of the coolant 240 disposed within the chamber 220 may vary depending on a variety of factors, such as the volume of the chamber 220, the amount of the pyrotechnic material 230, etc. Accordingly, in some embodiments, the amount of the coolant 240 disposed within the chamber 220 may range between 50 mg and 150 mg. In some embodiments, the amount of the coolant 240 is 100 mg.

Figure 5:
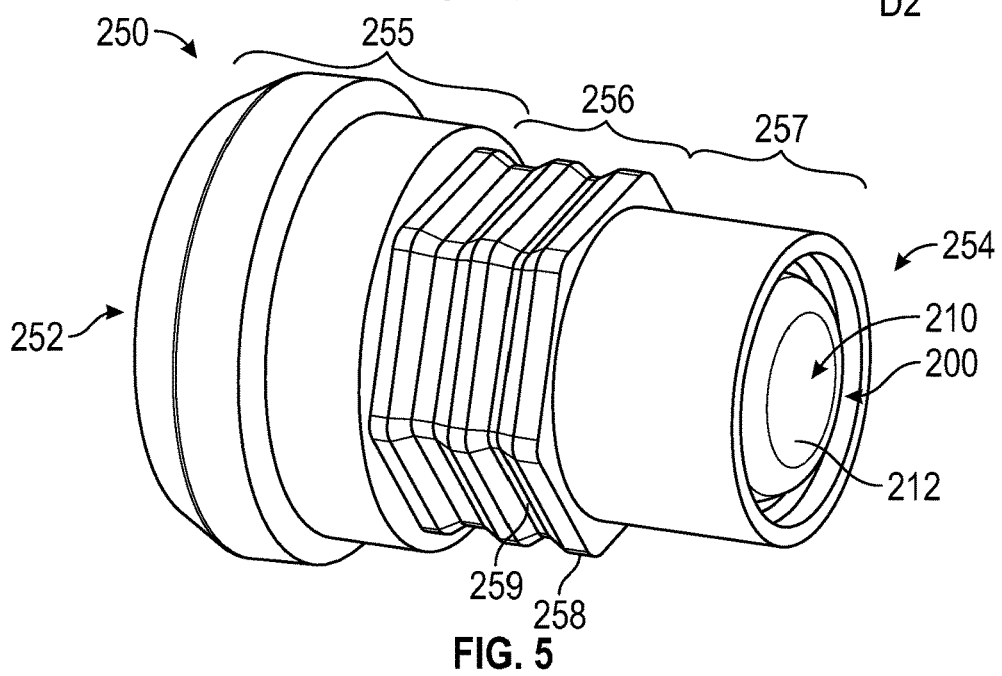
FIG. 5 is an isometric view of an actuator assembly encompassed in an over-mold according to an embodiment.
Figure 6:
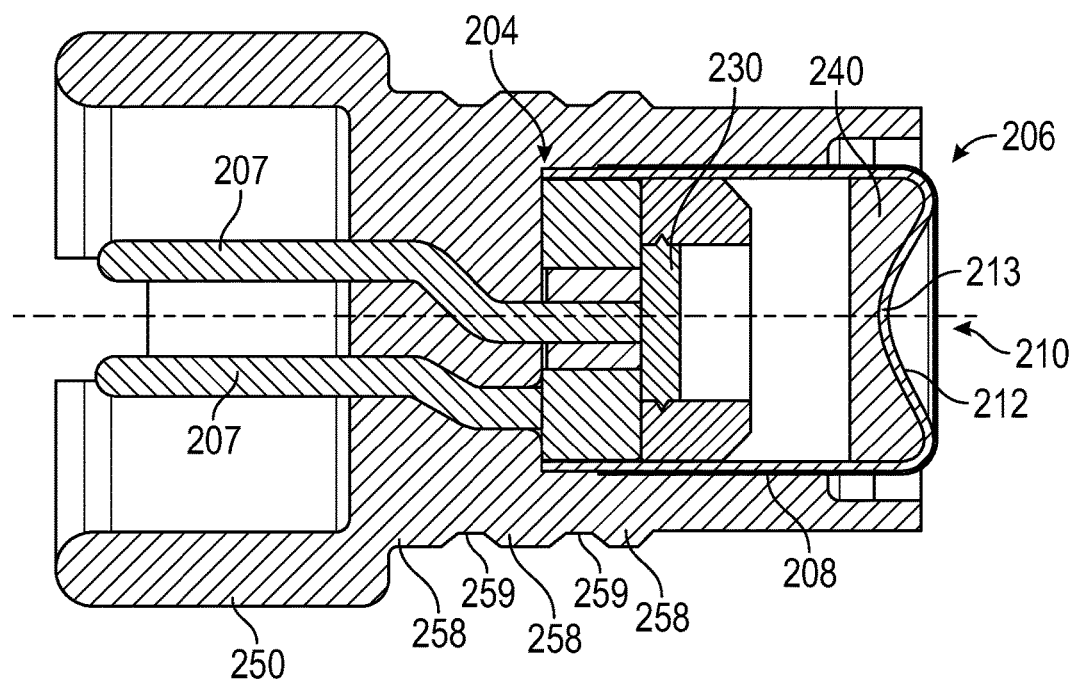
FIG. 6 is a cross-sectional view of the actuator assembly and over-mold of FIG. 5.

FIGS. 5 and 6 illustrate the actuator assembly 200 disposed within an over-mold 250. FIG. 5 illustrates an isometric view of the over-mold 250 and actuator assembly 200, and FIG. 6 illustrates a cross-sectional view of the over-mold 250 and actuator assembly 200. The over-mold 250 may be molded over the actuator assembly 200.

The over-mold 250 may comprise a first end 252 and a second end 254. The second end 254 of the over-mold 250 of FIGS. 5 and 6 comprises an open end. The open end of the over-mold 250 may allow the second end 206 of the actuator assembly 200 to align with the second end 254 of the over-mold 250. In some embodiments, the second end 206 of the actuator assembly 200 extends out of the open end of the second end 254 of the over-mold 250.

The first end 252 of the over-mold 250 may also comprise an open end. The electrical conductors 207 of the actuator assembly 200 may be accessible through the open end on the first end 252 of the over-mold 250.

Figure 7:
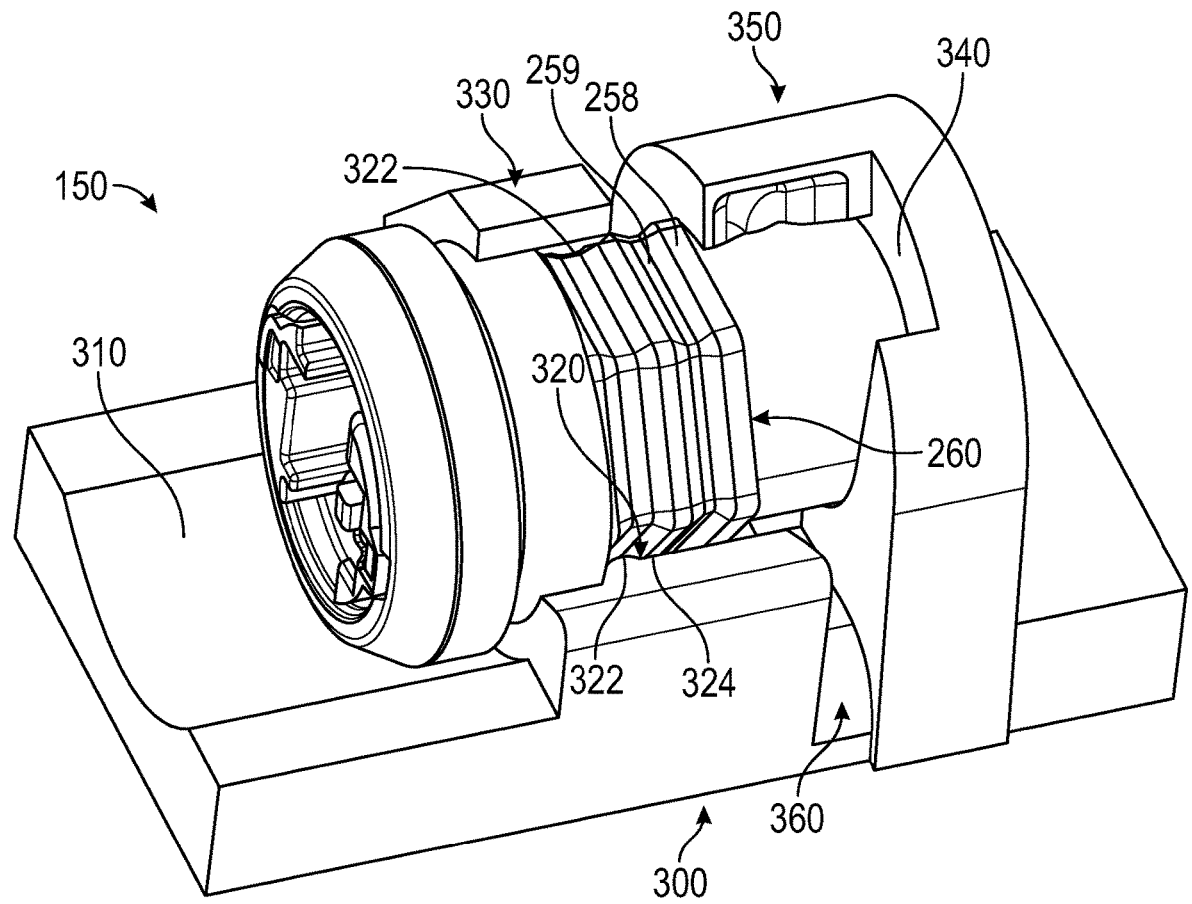
FIG. 7 is an isometric view of a tether release assembly that comprises an actuator assembly encompassed in an over-mold.

An outer surface of the over-mold 250 may comprise a plurality of sections or portions, a first end portion 255, a hexagon shaped portion 256, and a second end portion 257. The shape of the hexagon shaped portion 256 may facilitate assembly, and specifically insertion of the over-mold 250 into a housing assembly. The present disclosure is not limited to a hexagon shape for the hexagon shaped portion 256. In some embodiments, the hexagon shaped portion 256 may be non-circular and a variety of different cross-sectional shapes may be used, such as triangular, square, rectangular, polygonal, octagonal, and the like. The first end portion 255 extends from the first end 252 to the hexagon shaped portion 256 in a longitudinal direction of the over-mold 250. A first end portion 255 may comprise a plurality of different sections, each section with a different diameter, to enable the first end portion 255 to interact with the assembly housing 300, as illustrated in FIG. 7.

The hexagon shaped portion 256 longitudinally extends between the first end 252 and the second end 254 of the over-mold 250. The hexagon shaped portion 256 comprises six equal sides that encompass and define the circumference of the over-mold 250. The hexagon shaped portion 256 may comprise a textured surface. The textured surface of the hexagon shaped portion 256 may comprise a plurality of ribs 258 that are longitudinally spaced along the over-mold 250, wherein each rib 258 encompasses the circumference of the over-mold 250. In the illustrated embodiment, the hexagon shaped portion 256 comprises three ribs 258; however, the over-mold 250 may have more or fewer than three ribs 258. Valleys 259 may be disposed between adjacent ribs 258 and are longitudinally spaced along the hexagon shaped portion 256. The valleys 259 may be annular grooves that encircle the hexagon shaped portion 256. The valleys 259 may be define by adjacent ribs 258. The ribs 258 may extend radially outward from the outer surface of the over-mold 250. The valleys 259 may extend radially inward from the outer surface of the over-mold 250.

The second end portion 257 extends from the hexagon shaped portion 256 to the second end 254. The second end portion 257 may comprise a constant diameter that enables the second end portion 257 to be secured in a portion of the assembly housing 300, as illustrated in FIG. 7 and as discussed in more detail below.

The over-mold 250 may be fabricated from a number of different materials, such as high-density polyethylene (HDPE), acrylonitrile butadiene styrene (ABS), acrylic polymethyl methacrylate (acrylic PMMA), acetal copolymer, acetal polyoxymethylene copolymer, poly ether ketone (PEEK), polyetherimide (PEI), polybutylene terephthalate (PBTR), polyamide (PA) including (HTN), polyphthalamide (PPA), and the like.

FIG. 7 illustrates an assembly housing 300 of the tether release assembly 150. The assembly housing 300 is configured to house the actuator assembly 200 disposed within the over-mold 250. The assembly housing 300 may at least partially encompasses the actuator assembly 200 disposed within the over-mold 250. The over-mold 250 is configured to be able to slide along an inner surface or a sliding path within the assembly housing 300. For example, the assembly housing 300 may comprise a sliding surface 310, an engaging surface 320, a retaining arm 330, a reactive surface 340, a retaining end 350, and a tether slot 360. The inner surface may include the sliding surface 310 and the engaging surface 320.

The sliding surface 310 is disposed on a first end of the assembly housing 300 and enables the over-mold 250 to slide along the sliding surface 310 during actuation of the actuator assembly 200.

The engaging surface 320 comprises a surface that corresponds to the hexagon shaped portion 256 of the over-mold 250. The engaging surface may comprise a textured surface that corresponds with the textured surface of the hexagon shaped portion 256 of the over-mold 250. The textured surface of the engaging surface 320 may comprise a plurality of ribs 322 and valleys 324 that are longitudinally spaced apart from each other. The ribs 322 may extend radially inward from the inner surface of the assembly housing 300. The valleys may extend radially outward from the inner surface of the assembly housing 300. The ribs 322 of the engaging surface 320 are configured to fit or nest within the valleys 259 of the over-mold 250, and the ribs 258 of the over-mold 250 are configured to fit or otherwise nest within the valleys 324 of the engaging surface 320. Accordingly, when the over-mold 250 is engaged with the engaging surface 320, a predetermined amount of force is needed to dislodge the over-mold 250 from the engaging surface 320 and enable the over-mold 250 to slide relative to the assembly housing 300.

The retaining arm 330 is configured to retain the over-mold 250 within the assembly housing 300 before actuation.

The retaining 330 arm may partially encircle the over-mold 250 to retain the over-mold 250 within the assembly housing 300. An inner surface of the retaining arm 330 may comprise at least one rib 322 that fits or nests in a valley 259 of the over-mold or simply between two adjacent ribs 258 of the over-mold 250.

The reactive surface 340 of the assembly housing 300 is configured to interact with the surface 210 of the tubular housing 202. The second end 206 of the tubular housing 202 abuts the reactive surface 340 pre-actuation. During actuation, the pre-actuation concave surface 212 transitions to the post-actuation convex surface 214 and the inflection point 215 impacts the reactive surface 340 at a predetermined amount of force. The amount of force generated exceeds the amount of predetermined force needed to dislodge the ribs 258 of the over-mold 250 from the valleys of the engaging surface 320 and the actuator assembly is displaced relative to the assembly housing 300. In some embodiments, the transition between the concave surface 212 to the convex surface 214 may create at least 1000 Newtons (N) of force when the surface 210 impacts the reactive surface 340. In some embodiments, the retaining arm 230 is flexible and the force produced by the actuation of the pyrotechnic material 230 causes the ribs 258 of the over-mold 250 to push the retaining arm 330 radially outward thereby facilitating the over-mold 250 sliding relative to the assembly housing 300.

The retaining end 350 is configured to secure and retain the second end 254 of the over-mold 250 when the over-mold 250 is in the pre-actuated configuration.

The tether slot 360 is disposed between the retaining arm 330 and the retaining end 350. The tether slot 360 enables the tether 120 to loop around the over-mold 250, thus securing the tether 120 to the tether release assembly 150. The tether 120 remains in a taught configuration until the tether 120 is released from the tether release assembly 150 through actuation of the actuator assembly 200 and actuation of the tether release assembly 150.

Figure 8:
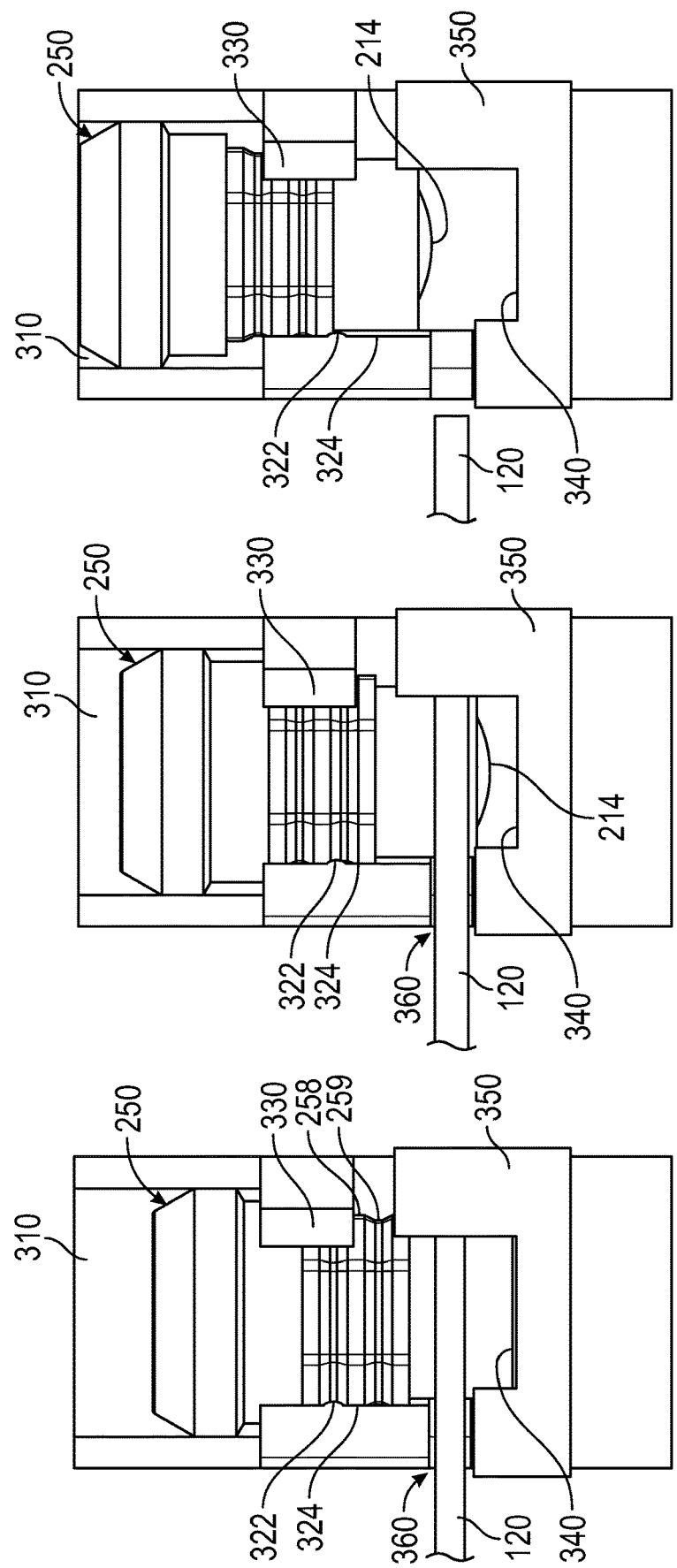
FIG. 8A is a view of a tether release assembly in a pre-actuation configuration of an actuator assembly according to one embodiment.
FIG. 8B is a view of the tether release assembly of FIG. 8A in a post-actuation configuration of the actuator assembly.
FIG. 8C is a view of the tether release assembly wherein the tether is released.

FIGS. 8A-8C illustrate the actuation of the tether release assembly 150 from the pre-actuation configuration to the post-actuation configuration and to the release of the tether 120. FIG. 8A illustrates the tether release assembly 150 in a pre-actuation configuration. The over-mold 250 and the actuator assembly 200 are housed within the assembly housing 300. In response to a predetermined event, such as a collision event, an electrical signal may be sent to the actuator assembly 200 through the electrical conductors 207 to ignite the pyrotechnic material 230. The ignition of the pyrotechnic material 230 produces gas and a sufficient pressure wave to transition the surface 210 of the second end 206 of the tubular housing 202 from the concave surface 212 to the convex surface 214. The inflection point 215 of the convex surface 214 impacts the reactive surface 340 and produces a sufficient amount of force to dislodge the ribs 258 from the valleys of the engaging surface 320 and the over-mold 250 starts to slide along the sliding surface 310. The tether 120 is wrapped or looped around the over-mold 250. The load on the tether 120 may vary from no load or no tension to a snap load or significantly high tension (i.e., 1100 N).

FIG. 8B illustrates the tether release assembly 150 in a post-actuation configuration. The over-mold 250 is sliding along the sliding surface 310, but the tether 120 is still wrapped around the over-mold 250. The tether slot 360 keeps the tether 120 in a predetermined position, thus the over-mold 250 is configured to slide relative to the tether 120.

FIG. 8C illustrates the tether release assembly 150 releasing the tether 120. After the over-mold 250 travels a predetermined distance and clears the tether slot 360, the tether 120 is detached or released.

Figure 9:
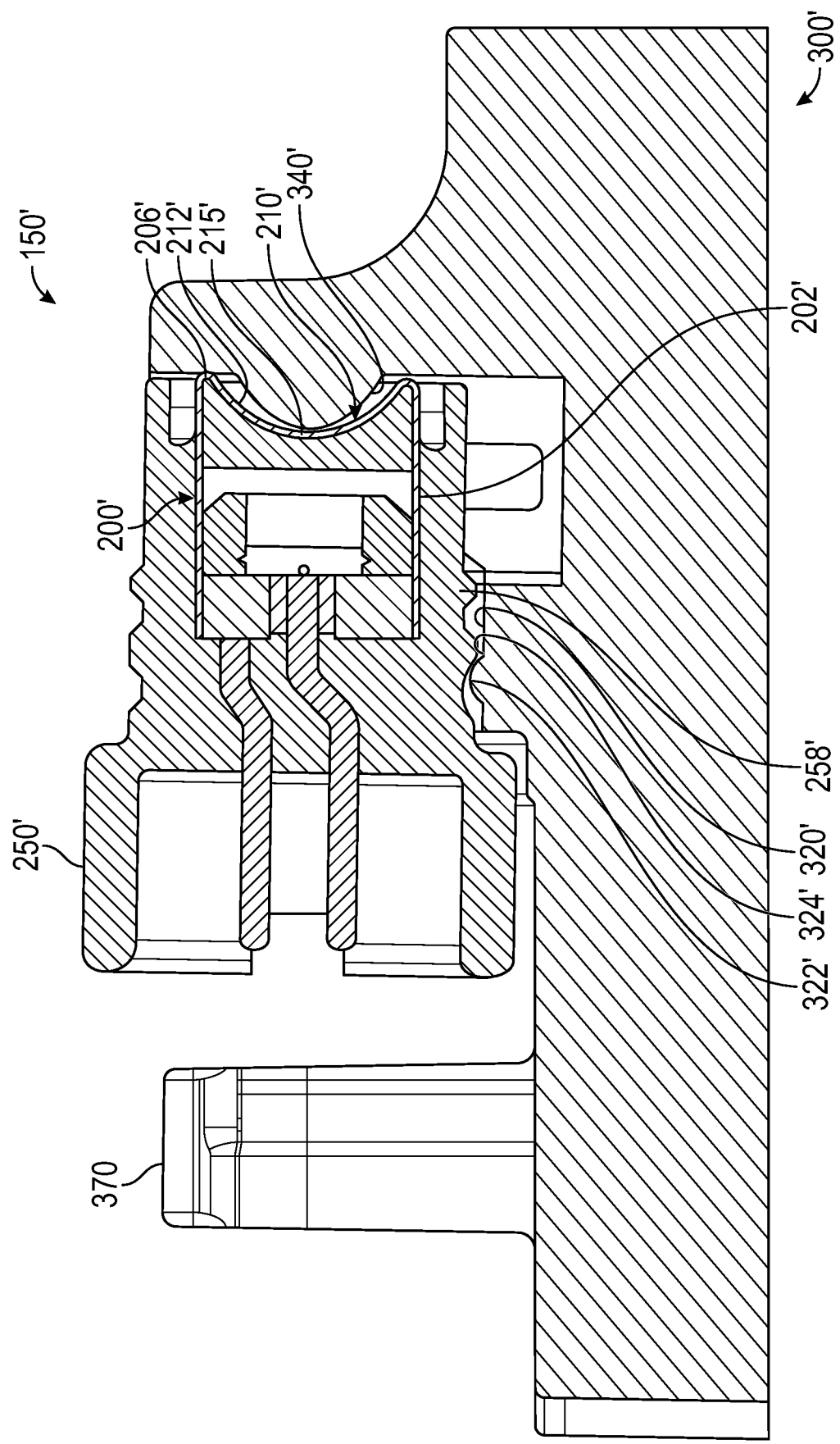
FIG. 9 is a cross-sectional view of a tether release assembly according to one embodiment.

FIG. 9 depicts an embodiment of a tether release assembly 150' that resembles the tether release assembly 150 described above in certain respects. Accordingly, like features are designated with like reference numerals, with an apostrophe. For example, the embodiment depicted in FIG. 9 includes an assembly housing 300' that may, in some respects, resemble the assembly housing 300 of FIG. 7. Relevant disclosure set forth above regarding similarly identified features thus may not be repeated hereafter. Moreover, specific features of assembly housing 300 and related components shown in FIG. 7 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the tether assembly 150' and related components depicted in FIG. 9. Any suitable combination of the features, and variations of the same, described with respect to the tether assembly 150 and related components illustrated in FIG. 7 can be employed with the tether assembly 150' and related components of FIG. 9, and vice versa. This pattern of disclosure applies equally to further embodiments depicted in subsequent figures and described hereafter, wherein the leading digits may be further incremented.

The tether assembly 150' includes an actuator assembly 200' disposed within an over-mold 250'. The over-mold 250' is housed within the assembly housing 300'. The assembly housing 300' includes a reactive surface 340' that is configured to interact with a surface 210' of a tubular housing 202' of the actuator assembly 200'. The second end 206' of the tubular housing 202' abuts the reactive surface 340' pre-actuation. The reactive surface 340' may include a bump or convex feature. The bump or convex feature may comprise an inflection point and the inflection point of the bump or convex feature may align with the inflection point 213 of the concave surface 212 of the second end 206 of the tubular housing 202.

The bump or convex feature may correspond with a concave surface 212' of the surface 210'. In some embodiments, the bump or convex feature may have a radius of curvature equal to the radius of curvature of the concave surface 212'. In some embodiments, the bump or convex feature may have a radius of curvature greater than the radius of curvature of the concave surface 212'. In some embodiments, the bump or convex feature may have a radius of curvature less than the radius of curvature of the concave surface 212'.

During actuation, the pre-actuation concave surface 212' transitions to the post-actuation convex surface and impacts the bump or convex feature of the reactive surface 340' at a predetermined amount of force. The amount of force generated exceeds the amount of predetermined force needed to dislodge the ribs 258' of the over-mold 250' from ribs 322' and valleys 324' of the engaging surface 320' and the actuator assembly is displaced relative to the assembly housing 300'. In some embodiments, the transition between the concave surface 212' to the convex surface creates at least 1000 N of force when the surface 210' impacts the reactive surface 340'.

In some embodiments, the assembly housing 300' may further comprise a stop wall 370' that is configured to stop the relative movement of the over-mold 250' relative to the assembly housing 300' after actuation of the pyrotechnic material. The stope wall 370' is configured to engage with and slow down the over-mold after actuation.

Example 1. An actuator device comprising: an actuator cup comprising a first end and a second end, the actuator cup defining a storage chamber containing a pyrotechnic material to produce gas; and at least one electrical connection coupled to the first end, the electrical connection in reaction initiating communication with the pyrotechnic material, wherein the second end of the actuator cup comprises a concave surface before actuation of the pyrotechnic material and during the actuation of the pyrotechnic material the second end transitions from the concave surface to a convex surface.

Example 2. The actuator device of example 1, further comprising a coolant disposed within the storage chamber of the actuator cup.

Example 3. The actuator device of example 2, wherein the coolant is aluminum hydroxide.

Example 4. The actuator device of example 2, wherein the coolant is disposed at an inflection point of the concave surface.

Example 5. The actuator device of example 1, wherein the gas is contained within the storage chamber after actuation of the pyrotechnic material.

Example 6. The actuator device of example 1, wherein the transition between the concave surface to the convex surface occurs in less than 0.4 msec.

Example 7. The actuator device of example 1, wherein the transition between the concave surface to the convex surface creates at least 1000 Newtons of force.

Example 8. An actuator assembly comprising: an actuator comprising: a tubular housing with a first end and a second end, the tubular housing defining a storage chamber containing a pyrotechnic material to produce gas; and at least one electrical connection coupled to the first end, the electrical connection in reaction initiating communication with the pyrotechnic material; wherein the second end of the tubular housing is formed as a concave surface before actuation of the pyrotechnic material and during the actuation of the pyrotechnic material the second end is transitioned from the concave surface to a convex surface; and an assembly housing configured to house the actuator, wherein the assembly housing comprises a reactive surface, wherein the second end of the tubular housing impacts the reactive surface during actuation of the pyrotechnic material.

Example 9. The actuator assembly of example 8, wherein during the transition between the concave surface to the convex surface, the second end impacts the reactive surface of the assembly housing to displace the actuator within the assembly housing away from the reactive surface.

Example 10. The actuator assembly of example 8, further comprising an actuator housing that partially encompasses the actuator.

Example 11. The actuator assembly of example 10, wherein the actuator housing comprises an outer hexagon shape that corresponds with an inner surface of the assembly housing.

Example 12. The actuator assembly of example 8, further comprising a coolant disposed within the storage chamber of the tubular housing.

Example 13. The actuator assembly of example 12, wherein the coolant is aluminum hydroxide.

Example 14. The actuator assembly of example 8, wherein the gas is contained within the storage chamber after actuation of the pyrotechnic material.

Example 15. The actuator assembly of example 8, wherein the transition between the concave surface to the convex surface occurs in less than 0.4 msec.

Example 16. The actuator assembly of example 8, further comprising a tether that is looped around the tubular housing and is released from the tubular housing after actuation of the pyrotechnic material.

Example 17. The actuator assembly of example 16, wherein the tether is released from the tubular housing when the actuator is displaced away from the reactive surface.

Example 18. The actuator assembly of example 16, wherein the assembly housing comprises an aperture that enables the tether to enter into the assembly housing through the aperture, loop around the tubular housing, and exit the assembly housing through the aperture.

Example 19. The actuator assembly of example 16, wherein the tether is under tension before actuation of the pyrotechnic material.

Example 20. An actuator device comprising: an actuator cup comprising a first end and a second end, the actuator cup defining a storage chamber containing a pyrotechnic material to produce gas; and at least one electrical connection coupled to the first end, the electrical connection in reaction initiating communication with the pyrotechnic material, wherein the second end of the actuator cup comprises an inflection point, wherein actuation of the pyrotechnic material displaces the inflection point of the second end an axial distance away from the first end of the actuator cup.

The terms "a" and "an" can be described as one but not limited to one. For example, although the disclosure may recite a tab having "a line of stitches," the disclosure also contemplates that the tab can have two or more lines of stitches.

Unless otherwise stated, all ranges include both endpoints and all numbers between the endpoints.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having reasonable skill in the art that changes may be made to the details of the above-described embodiments without departing from the underlying principles of the invention. Embodiments of the invention in which an exclusive property or privilege is claimed are as follows.

The invention claimed is:

1. An actuator device comprising:
an actuator cup comprising a first end and a second end, the actuator cup defining a single storage chamber containing a pyrotechnic material to produce gas; and
at least one electrical connection coupled to the first end, the electrical connection in reaction initiating communication with the pyrotechnic material;
a coolant disposed within the single storage chamber of the actuator cup,
wherein the second end of the actuator cup comprises a concave surface before actuation of the pyrotechnic material and during the actuation of the pyrotechnic material the second end transitions from the concave surface to a convex surface, and wherein the gas is contained within the single storage chamber after actuation of the pyrotechnic material and the actuator cup maintains its integrity during the actuation.

2. The actuator device of claim 1, wherein the coolant is aluminum hydroxide.

3. The actuator device of claim 1, wherein the coolant is disposed at an inflection point of the concave surface.

4. The actuator device of claim 1, wherein the transition between the concave surface to the convex surface occurs in less than 0.4 msec.

5. The actuator device of claim 1, wherein the transition between the concave surface to the convex surface creates at least 1000 Newtons of force.

6. An actuator assembly comprising:
an actuator device comprising:
a tubular housing with a first end and a second end, the tubular housing defining a storage chamber containing a pyrotechnic material to produce gas; and
at least one electrical connection coupled to the first end, the electrical connection in reaction initiating communication with the pyrotechnic material;
wherein the second end of the tubular housing is formed as a concave surface before actuation of the pyrotechnic material and during the actuation of the pyrotechnic material the second end is transitioned from the concave surface to a convex surface and maintains its integrity throughout the actuation; and
an assembly housing configured to house the actuator device, wherein the assembly housing comprises a reactive surface, wherein the second end of the tubular housing impacts the reactive surface during actuation of the pyrotechnic material, and wherein the assembly housing maintains its integrity throughout the actuation, wherein during the transition between the concave surface to the convex surface, the second end impacts the reactive surface of the assembly housing to displace the actuator within the assembly housing in a direction substantially opposite a direction of a displacement of the second end during the transition between the concave surface to the convex surface.

7. The actuator assembly of claim 6, further comprising an actuator housing that partially encompasses the actuator.

8. The actuator assembly of claim 7, wherein the actuator housing comprises an outer hexagon shape portion that corresponds with an inner surface of the assembly housing.

9. The actuator assembly of claim 8, wherein the outer hexagon shape portion comprises a plurality of ribs that are longitudinally spaced along the hexagon shaped portion, wherein each rib encompasses the circumference of the actuator housing to engage the inner surface of the assembly housing to limit longitudinal movement of the actuator housing relative to the assembly housing.

10. The actuator assembly of claim 6, further comprising a coolant disposed within the storage chamber of the tubular housing.

11. The actuator assembly of claim 10, wherein the coolant is aluminum hydroxide.

12. The actuator assembly of claim 6, wherein the gas is contained within the storage chamber after actuation of the pyrotechnic material.

13. The actuator assembly of claim 6, wherein the transition between the concave surface to the convex surface occurs in less than 0.4 msec.

14. The actuator assembly of claim 6, further comprising a tether that is looped around the tubular housing and is released from the tubular housing after actuation of the pyrotechnic material.

15. The actuator assembly of claim 14, wherein the tether is released from the tubular housing when the actuator is displaced away from the reactive surface.

16. The actuator assembly of claim 14, wherein the assembly housing comprises an aperture that enables the tether to enter into the assembly housing through the aperture, loop around the tubular housing, and exit the assembly housing through the aperture.

17. The actuator assembly of claim 14, wherein the tether is under tension before actuation of the pyrotechnic material.

18. An actuator device comprising:
an actuator cup comprising a first end and a second end, the actuator cup defining a storage chamber directly containing a pyrotechnic material to produce gas; and
at least one electrical connection coupled to the first end, the electrical connection in reaction initiating communication with the pyrotechnic material,
wherein the second end of the actuator cup comprises an inflection point, wherein actuation of the pyrotechnic material displaces the inflection point of the second end an axial distance away from the first end of the actuator cup,
wherein the second end of the actuator cup maintains its integrity during the displacement of the inflection point, and
wherein the gas produced by the pyrotechnic material does not escape the actuator cup; and
a tether that is looped around the actuator cup and is released from the actuator cup after actuation of the pyrotechnic material due to displacement of the actuator cup from a tether location.

* * * * *